US012785231B2

(12) United States Patent
Park et al.

(10) Patent No.: US 12,785,231 B2
(45) Date of Patent: Nov. 3, 2026

(54) ELECTRODE ASSEMBLY HAVING FOLDED ADHERED SEPARATORS AND SECONDARY BATTERY INCLUDING THE SAME

(71) Applicant: LG Energy Solution, Ltd., Seoul (KR)

(72) Inventors: Suhan Park, Daejeon (KR); Younghwan Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 576 days.

(21) Appl. No.: 18/272,694

(22) PCT Filed: Mar. 22, 2022

(86) PCT No.: PCT/KR2022/003956

§ 371 (c)(1), (2) Date: Jul. 17, 2023

(87) PCT Pub. No.: WO2022/203338

PCT Pub. Date: Sep. 29, 2022

(65) Prior Publication Data

US 2024/0079751 A1 Mar. 7, 2024

(30) Foreign Application Priority Data

Mar. 22, 2021 (KR) ........................ 10-2021-0036922

(51) Int. Cl.
*H01M 50/586* (2021.01)
*H01M 10/04* (2006.01)
(Continued)

(52) U.S. Cl.
CPC ..... *H01M 50/586* (2021.01); *H01M 10/0413* (2013.01); *H01M 10/0459* (2013.01); *H01M 10/647* (2015.04); *H01M 50/595* (2021.01)

(58) Field of Classification Search
CPC ............. H01M 50/586; H01M 50/595; H01M 10/647; H01M 10/0413; H01M 10/0459
See application file for complete search history.

(56) References Cited

U.S. PATENT DOCUMENTS 5,334,162 A * 8/1994 Harris ...................... A61M 5/24 604/416
2007/0154790 A1 7/2007 Jeung et al.
(Continued)

FOREIGN PATENT DOCUMENTS

CN 103109408 A 5/2013
CN 103904368 A 7/2014
(Continued)

OTHER PUBLICATIONS

JP_5334162 Translation (Year: 1994).*
(Continued)

*Primary Examiner* — Jimmy Vo
(74) *Attorney, Agent, or Firm* — Lerner David LLP

(57) ABSTRACT

An electrode assembly and a secondary battery including the electrode assembly improve the safety of secondary batteries even under a high-temperature and heat-shrinkage environment of the separator. The electrode assembly includes a cathode plate, an anode plate corresponding to the cathode plate, and first and second separators that are disposed adjacent to each other with the cathode plate or the anode plate interposed therebetween. At least one end of the first separator is adhered to at least one end of the second separator along the longitudinal direction of the cathode plate and the anode plate. At least one end of the first and second separators is folded so as to form a folded part of the first and second separators and wrap the cathode plate or the anode plate. The electrode assembly further includes an insulating tape covering the folded part of the first and second separators.

19 Claims, 4 Drawing Sheets

(51) Int. Cl.

| | |
|---|---|
| ***H01M 10/647*** | (2014.01) |
| ***H01M 50/595*** | (2021.01) |

(56) References Cited

U.S. PATENT DOCUMENTS

| | | | |
|---|---|---|---|
| 2011/0151307 | A1 | 6/2011 | Hwang et al. |
| 2011/0195298 | A1 | 8/2011 | Daidoji et al. |
| 2012/0276436 | A1 | 11/2012 | Kaneko et al. |
| 2013/0171497 | A1 | 7/2013 | Enomoto et al. |
| 2014/0212751 | A1 | 7/2014 | Ku et al. |
| 2014/0272507 | A1 | 9/2014 | Ku et al. |
| 2014/0363727 | A1 | 12/2014 | Ko et al. |
| 2014/0363729 | A1 | 12/2014 | Kim et al. |
| 2014/0370362 | A1 | 12/2014 | Park et al. |
| 2018/0131031 | A1 | 5/2018 | Ku et al. |
| 2018/0198104 | A1 | 7/2018 | Park et al. |
| 2019/0165353 | A1 | 5/2019 | Hou et al. |
| 2019/0165409 | A1 | 5/2019 | Cui et al. |
| 2020/0411909 | A1 | 12/2020 | Okutani |
| 2023/0198098 | A1 | 6/2023 | Ping et al. |

FOREIGN PATENT DOCUMENTS

| | | | | |
|---|---|---|---|---|
| CN | 109860490 | A | 6/2019 | |
| CN | 109860713 | A | 6/2019 | |
| CN | 111564593 | A | 8/2020 | |
| EP | 2874225 | B1 | 7/2016 | |
| JP | 2000311717 | A | 11/2000 | |
| JP | 2002198099 | A | 7/2002 | |
| JP | 2002208442 | A | 7/2002 | |
| JP | 2007141714 | A | 6/2007 | |
| JP | 2010062109 | A | 3/2010 | |
| JP | 5017754 | B2 | 9/2012 | |
| JP | 2013206700 | A | 10/2013 | |
| JP | 5334162 | B2 * | 11/2013 | .......... H01M 50/466 |
| JP | 2014533425 | A | 12/2014 | |
| JP | 2015511764 | A | 4/2015 | |
| JP | 2015531155 | A | 10/2015 | |
| JP | 2019179654 | A | 10/2019 | |
| KR | 20070073169 | A | 7/2007 | |
| KR | 20110069713 | A | 6/2011 | |
| KR | 20130111697 | A | 10/2013 | |
| KR | 20140088343 | A | 7/2014 | |
| KR | 101561339 | B1 | 10/2015 | |
| KR | 101595643 | B1 | 2/2016 | |
| KR | 101746628 | B1 | 6/2017 | |
| KR | 20180050133 | A | 5/2018 | |
| WO | WO-2014126432 | A1 * | 8/2014 | ........ H01M 10/0472 |

OTHER PUBLICATIONS

WO_2014126432 (Year: 2014).*

Extended European Search Report including Written Opinion for Application No. 22776039.4 dated Mar. 20, 2025, pp. 1-9.

International Search Report for PCT/KR2022/003956 mailed Jul. 4, 2022. 3 pages.

* cited by examiner

ELECTRODE ASSEMBLY HAVING FOLDED ADHERED SEPARATORS AND SECONDARY BATTERY INCLUDING THE SAME

CROSS-REFERENCE TO RELATED APPLICATIONS

The present application is a national phase entry under 35 U.S.C. § 371 of International Application No. PCT/KR2022/003956 filed on Mar. 22, 2022, and published as International Publication No. WO 2022/203338 A1, which claims priority from Korean Patent Application No. 10-2021-0036922 filed on Mar. 22, 2021, the entire contents of all of which are hereby incorporated herein by reference in their entireties.

The present disclosure relates to an electrode assembly and a secondary battery including the same, and more particularly, to an electrode assembly and a secondary battery that can improve the safety of secondary batteries even under a high-temperature and heat-shrinkage environment of the separator.

BACKGROUND

Along with the technology development and increased demand for mobile devices, demand for secondary batteries as energy sources has been increasing rapidly. Accordingly, many researches on secondary batteries that can meet various demands are being conducted. A secondary battery has attracted considerable attention as an energy source for power-driven devices, such as an electric bicycle, an electric vehicle, and a hybrid electric vehicle, as well as an energy source for mobile devices, such as a cellular phone, a digital camera, and a laptop computer.

A small-sized device such as a cellular phone, a camera, or the like uses a small-sized battery pack in which one battery cell is packed. However, a middle or large-sized device such as a laptop computer, an electric vehicle, or the like uses a middle or large-sized battery pack in which a battery pack consisting of two or more battery cells connected in parallel and/or in series is packed.

In the case of the lithium secondary battery, there is a problem that it has excellent electrical characteristics, while it is low in safety. For example, the lithium secondary battery causes decomposition reactions of active materials, electrolytes and the like, which are battery constituent elements, to thereby generate heat and gas. The high-temperature and high-pressure conditions resulting therefrom can further promote the decomposition reaction to cause ignition or explosion. In a more specific example, in a conventional electrode assembly and a prismatic or pouch-type secondary battery including the same, there are many cases in which separators included in the electrode assembly are thermally contracted under exposure to a high-temperature environment. Due to the thermal contraction of the separator, a cathode and an anode may directly face each other, causing an electrical short circuit. As a result, the lithium secondary battery may cause ignition, explosion or the like.

In particular, in recent years, as lithium secondary battery is made high in capacity and voltage, for example, a cathode active material containing nickel at a high content of 60% by weight or more is widely used. The cathode active material containing such a high content of nickel has a high heating value and a low structural collapse temperature and thus, is relatively low in thermal stability. Therefore, the issues related to the safety of the above-mentioned secondary battery, particularly, the high-temperature safety, are becoming more prominent.

Due to such disadvantages of the conventional electrode assembly, there is a continuous need to develop a technology that can enhance the safety of the secondary battery even under a high-temperature heat-shrinkable environment of the separator.

SUMMARY OF THE DISCLOSURE

It is an object of the present disclosure to provide an electrode assembly can improve the safety of secondary batteries even under a high-temperature and heat-shrinkage environment of the separator, and a secondary battery including the same.

However, the problem to be solved by the embodiments of the present disclosure is not limited to the above-described problems and can be variously expanded within the scope of the technical idea included in the present disclosure.

According to one aspect of the present disclosure, there is provided an electrode assembly comprising:

a cathode plate, an anode plate corresponding to the cathode plate, and first and second separators that are disposed adjacent to each other with the cathode plate or the anode plate interposed therebetween, wherein at least one end of the first separator is adhered to at least one end of the second separator along the longitudinal direction of the cathode plate and the anode plate, wherein at least one end of the first and second separators is folded so as to wrap the cathode plate or the anode plate, and wherein the electrode assembly further comprises an insulating tape covering the folded part of the first and second separators.

According to one aspect of the present disclosure, there is provided a secondary battery comprising: the electrode assembly, and a battery case for housing the electrode assembly.

In the electrode assembly of the present disclosure, the separators added between the cathode plate and the anode plate stacked on each other are adhered to each other and folded so as to wrap the cathode plate and the anode plate, and an insulating tape is covered around them.

As a result, even when the electrode assembly and the secondary battery are exposed to a high-temperature environment or the like, a phenomenon in which the separator is thermally contracted to cause an electrical short circuit between the cathode plate and the anode plate can be minimized. Therefore, even if a cathode active material or the like containing a high content of nickel is applied, it is possible to minimize the ignition, explosion or the like of the secondary battery and thus maximize the safety of the lithium secondary battery.

In addition, as the mutually adhered separators are folded so as to wrap the cathode plate and the anode plate, the process of inserting the electrode assembly into a pouch-type battery case or the like can be performed more smoothly.

Therefore, the present disclosure provides a secondary battery with high capacity and high energy density by applying a cathode active material or the like containing a high content of nickel, and also can improve the safety and processability of such secondary battery and thus can greatly contribute to the provision of high-quality secondary battery.

DETAILED DESCRIPTION

Figure 1:
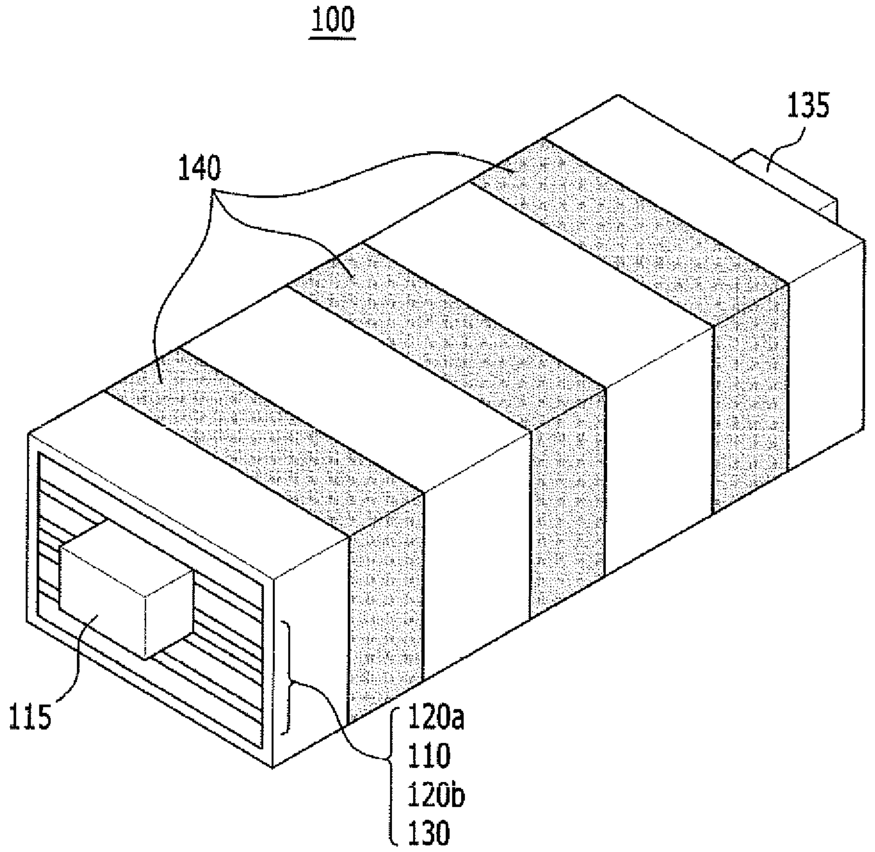
FIG. 1 is a perspective view which schematically shows an electrode assembly according to an embodiment of the present disclosure.

Hereinafter, various embodiments of the present disclosure will be described in detail with reference to the accompanying drawings so that those skilled in the art can easily carry out them. The present disclosure can be modified in various different ways and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the description, when a portion is referred to as "including" or "comprising" a certain component, it means that the portion can further include other components, without excluding the other components, unless otherwise stated.

Further, throughout the description, when referred to as "planar (or plane view)", it means when a target portion is viewed from the upper side, and when referred to as "cross-sectional (or cross-sectional view)", it means when a target portion is viewed from the side of a cross section cut vertically.

FIGS. 1, 3*a*, 3*b*, and 4*a* show a perspective view, a plan view, and a cross-sectional view of an electrode assembly according to embodiments of the present disclosure, respectively.

As shown in these FIGS. 1, 3*a*, 3*b* and 4*a*, according to one embodiment of the disclosure, there is provided an electrode assembly 100 comprising:

a cathode plate 110, an anode plate 130 corresponding to the cathode plate 110, and first and second separators 120*a* and 120*b* disposed adjacent to each other with the cathode plate 110 or the anode plate 130 interposed therebetween, wherein at least one end of the first separator 120*a* is adhered to at least one end of the second separator 120*b* along the longitudinal direction of the cathode plate 110 and the anode plate 130, wherein at least one end of the first and second separators 120*a* and 120*b* is folded so as to wrap the cathode plate 110 or the anode plate 130, and wherein the electrode assembly 100 further comprises an insulating tape 140 covering the folded part of the first and second separators 120*a* and 120*b*.

Figure 2:
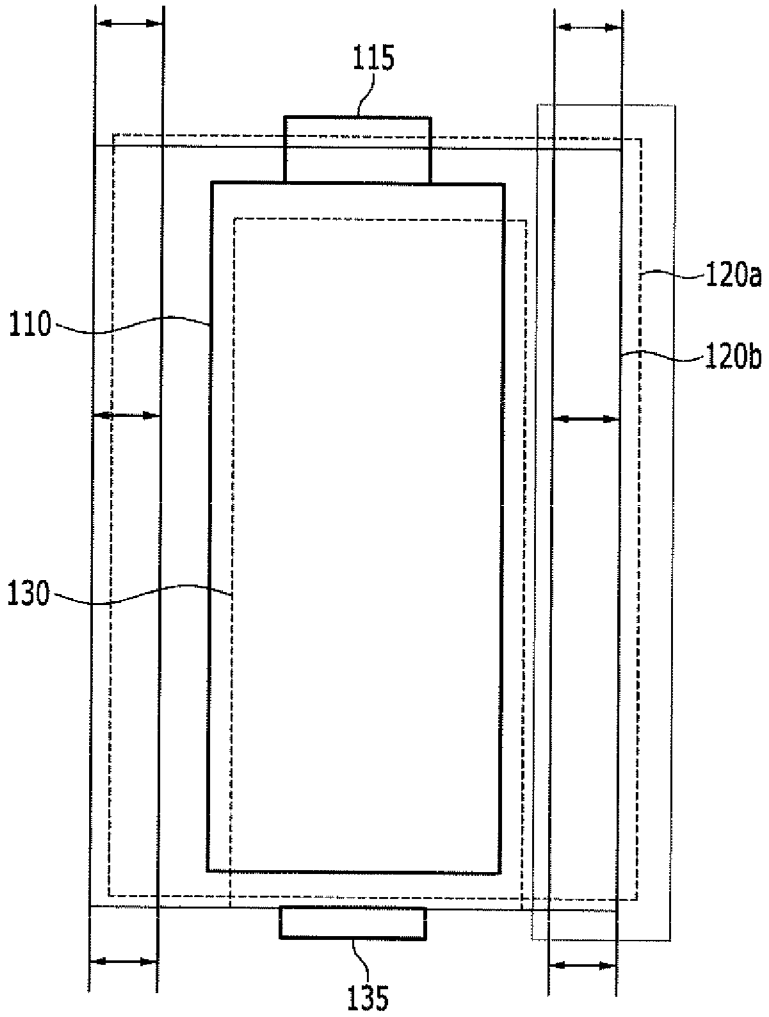
FIG. 2 is a plan view which schematically shows an electrode-separator laminate for manufacturing an electrode assembly according to an embodiment of the present disclosure.

The electrode assembly 100 of the one embodiment includes a stack-type electrode-separator laminate in which basically, the cathode plate 110 and the anode plate 130 are alternately stacked with each other, and the first and second separators 120*a* and 120*b* are respectively formed between the alternately stacked cathode plate 110 and anode plate 130. Referring to FIG. 2, in this stack-type electrode-separator laminate, the first and second separators 120*a* and 120*b* are formed/arranged so as to have a width larger than that of the cathode plate 110 and the anode plate 130 (part indicated by a square on the right side in FIG. 2).

Figure 3A:
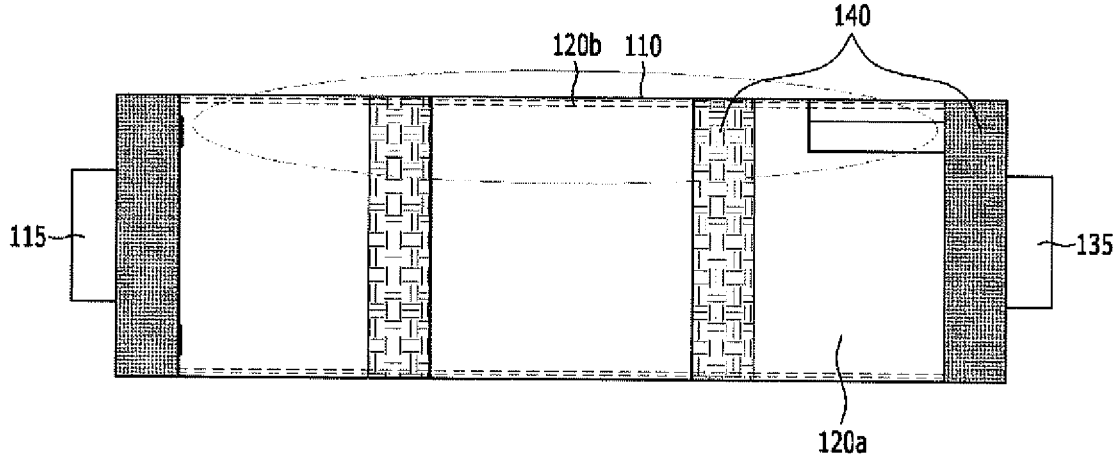
FIGS. 3*a* and 3*b* are plan views which schematically show an electrode assembly according to embodiments of the present disclosure.
Figure 3B:
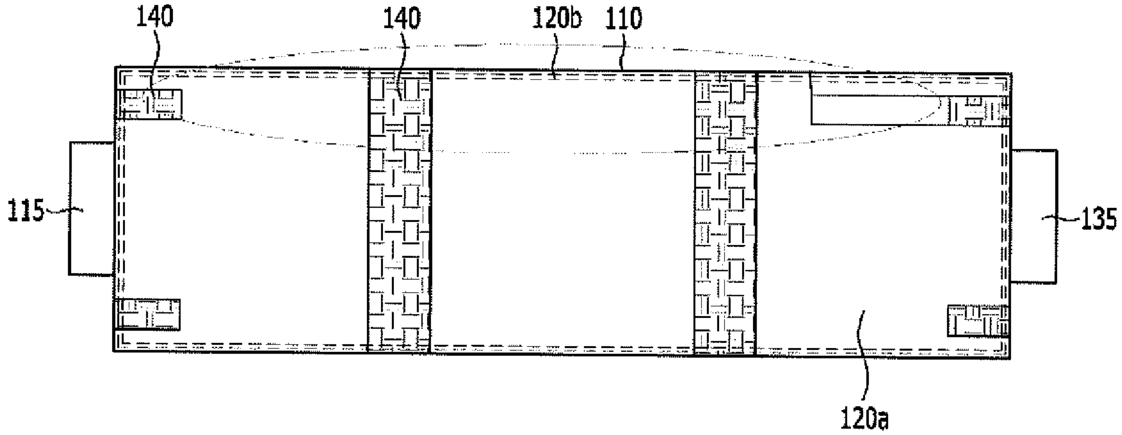
Figure 4A:
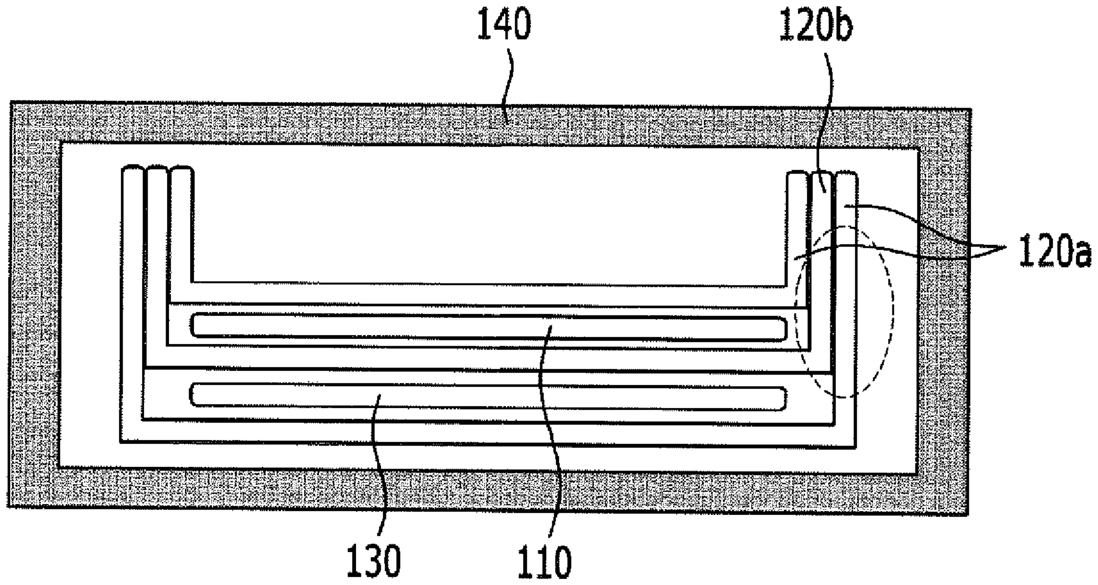
FIG. 4*a* is a cross-sectional view which schematically shows an electrode assembly according to embodiments of the present disclosure.

Further, as shown in FIGS. 3*a*, 3*b* and 4*a*, at least one end of the first separator 120*a* and the second separator 120*b* disposed adjacent to each other is adhered to each other along the longitudinal direction of the cathode plate 110 and the anode plate 130, and the mutual adhesive portions of the first and second separators 120*a* and 120*b* are folded so as to wrap the cathode plate 110 and/or the anode plate 130 (part indicated by a circle in FIGS. 3*a*, 3*b* and 4*a*).

In addition, an insulating tape 140 is formed so as to wrap around the cathode plate 110 and the anode plate 130 along the width direction perpendicular to the longitudinal direction, while covering the folded parts of the first and second separators 120*a* and 120*b*.

In this manner, the electrode assembly 100 of one embodiment has three types of separator-fixing structures in which at least one end of the first and second separators 120*a* and 120*b* adjacent to each other are adhered to each other, they are folded around the cathode plate 110 and the anode plate 130, and an insulating tape 140 is formed around the folded parts of the first and second separators 120*a* and 120*b* and the electrode plates 110 and 130.

Due to the fixing structure of the first and second separators 120*a* and 120*b* and the fixing force therefrom, even if the electrode assembly 100 and the secondary battery are exposed to a high temperature environment or the like, or heat generation or the like occurs from the cathode active material, the thermal contraction forces of the first and second separators 120*a* and 120*b* are cancelled, so that the first and second separation membranes 120*a* and 120*b* cannot be thermally contracted. As a result, a phenomenon in which the cathode plate 110 and the anode plate 130 come into contact with each other due to the thermal contraction of these separators and cause electrical short circuit can be minimized. In particular, comparing with an electrode assembly in which the first and second separators are simply formed to have a width larger than that of each electrode plate to improve battery safety, the electrode assembly of an embodiment having the above-mentioned fixing structure of the separator can further significantly reduce thermal contraction of each separator and electrical short circuit of the electrode plates resulting therefrom.

Therefore, when the electrode assembly of one embodiment is applied, it can minimize ignition, explosion or the like of the secondary battery and greatly improve the safety of the secondary battery, especially a lithium secondary battery with high capacity and high energy density to which a cathode active material containing a high content of nickel is applied. In addition, as the first and second separators 120*a* and 120*b* adhered to each other are folded so as to wrap the cathode plate 110 and the anode plate 130, the process of inserting the electrode assembly 100 into a pouch-type battery case can also be made more smoothly.

Meanwhile, in the electrode assembly 100 of the above-mentioned embodiment, each of the cathode plate 110 and the anode plate 130 may include an electrode current collector; an electrode active material layer formed on the electrode current collector; and electrode tabs 115 and 135 formed so as to protrude from the electrode current collector.

Among them, the electrode current collector (i.e., cathode current collector) included in the cathode plate 110 may generally have a thickness of 3 to 500 μm. Such cathode current collector is not particularly limited as long as it has conductivity while not causing chemical changes to the secondary battery, and for example, stainless steel, aluminum, nickel, titanium, calcined carbon, or aluminum or stainless steel having a surface treated with carbon, nickel, titanium, silver, and the like can be used.

The electrode active material layer (i.e., cathode active material layer) of the cathode plate 110 includes a cathode active material, and examples of the cathode active material include a layered compound such as lithium cobalt oxide ($LiCoO_2$), lithium nickel oxide ($LiNiO_2$), or a compound substituted with one or more transition metals; lithium manganese oxides such as chemical formulae $L_{1+y}Mn_{2-y}O_4$ (where y is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi_{1-y}M_yO_2$ (where M═Co, Mn, Al, Cu, Fe, Mg, B or Ga, and y=0.01 to 0.3); lithium manganese composite oxide represented by chemical formulae $LiMn_{2-y}M_yO_2$ (where M═Co, Ni, Fe, Cr, Zn or Ta, y=0.01 to 0.1) or $Li_2Mn_3MO_8$ (where, M=Fe, Co, Ni, Cu or Zn); $LiMn_2O_4$ in which a part of Li in the chemical formula is substituted with an alkaline earth metal ion; a disulfide compound; $Fe_2(MoO_4)_3$, and the like, without being limited thereto.

However, when applying a lithium transition metal composite oxide-based positive electrode active material that contains 60% by weight or more, or 60 to 99% by weight of nickel, safety problems such as ignition, heat, or explosion of secondary batteries may occur more significantly, whereby the structure of the electrode assembly according to the embodiment of the present disclosure can be more preferably applied for the electrode assembly and the secondary battery including the cathode active material.

Meanwhile, the cathode active material layer can be produced by applying the cathode mixture containing a mixture of the cathode active material, the conductive material and the binder onto the remaining portion excluding the region where the cathode tab 115 is formed on the cathode current collector, followed by drying and rolling, and if necessary, a filler may be further added to the mixture. However, since the composition and formation method of the cathode active material layer may follow the composition and method of the active material layer included in a general lithium secondary battery, an additional description thereof will be omitted.

Meanwhile, the electrode current collector (i.e., anode current collector) included in the anode plate 130 may generally be manufactured to have a thickness of 3 to 500 micrometers. The anode current collector is not particularly limited as long as it has high conductivity without causing a chemical change to the battery including the electrode assembly, and for example, copper, stainless steel, an aluminum-cadmium alloy, or the like can be used.

In addition, the electrode active material layer (i.e., anode active material layer) of the anode plate 130 includes an anode active material, and the anode active material may include, for example, carbons such as hardly graphitizable carbon and graphite-based carbon; metal composite oxides such as $Li_xFeO_3(0≤x≤1)$, $Li_xWO_2(0≤x≤1)$, $Sn_xMe_{1-x}Me'_yO_z$ (Me: Mn, Fe, Pb, Ge; Me': Al, B, P, Si, Group 1, 2, 3 elements in the periodic table, halogen; 0≤x≤1; 1≤y≤3; 1≤z≤8); lithium metals; lithium alloys; silicon-based alloys; tin-based alloys; metal oxides such as SnO, $SnO_2$, PbO, $PbO_2$, $Pb_2O_3$, $Sb_2O_4$, $Sb_2O_5$, GeO, $GeO_2$, $Bi_2O_3$, $Bi_2O_4$ or $Bi_2O_5$; a conductive polymer such as polyacetylene; Li—Co—Ni based materials and the like.

Such an anode active material layer can be produced by applying the anode mixture containing a mixture of the anode active material, the conductive material and the binder onto the remaining portion excluding the region where the anode tab 135 is formed on the anode current collector, followed by drying and rolling, and if necessary, a filler may be further added to the mixture. The composition and formation method of such anode active material layer may follow general composition and method.

As shown in FIG. 2, in the manufacturing process of the electrode assembly 100 of one embodiment, a stack-type electrode-separator laminate is formed in which the cathode plate 110 and the anode plate 130 described above are alternately stacked with each other, first and second separators 120*a* and 120*b* having larger widths are respectively formed between the alternately stacked cathode plate 110 and anode plate 130, first and second separators 120*a* and 120*b* having larger widths are respectively formed to electrically insulate between the cathode plate 110 and the anode plate 130.

In such an electrode-separator laminate, the cathode plate 110 and the anode plate 130 adjacent to each other are in physical contact with the first and second separators 120*a* and 120*b* therebetween (for reference, FIG. 2 shows that the cathode plate 110, the anode plate 130, and the first and second separators 120*a* and 120*b* are spaced apart from each other, but this is for convenience of illustration). At this time, the first and second separators 120*a* and 120*b* may be in physical contact only with the cathode plate 110 or the anode plate 130 facing them, but they may be adhered to the cathode plate 110 or the anode plate 130 facing each other. Thereby, when the electrode assembly 100 and the secondary battery are exposed to a high temperature environment, and the like, the thermal contraction force of the first and second separators 120*a* and 120*b* can be further cancelled to thereby further minimize the thermal contraction phenomenon of the separator.

In the electrode-separator laminate and the electrode assembly 100 produced therefrom, an insulating thin film having high ion permeability, mechanical strength, and low contraction characteristics can be used as the first and second separators 120*a* and 120*b*. For example, a sheet or a nonwoven fabric made from an olefin-based polymer such as chemical resistant and hydrophobic polypropylene, glass fiber, or polyethylene can be used.

Meanwhile, in the electrode-separator laminate, the first separator 120*a* and the second separator 120*b* adjacent to each other may be formed so that at least one end or both ends thereof can be adhered to each other along the longitudinal direction of the cathode plate 110 and the anode plate 130 (part indicated by a square in FIG. 2, and indicated by a circle in FIGS. 3*a*, 3*b* and 4). At this time, in order to more effectively suppress the thermal contraction of the first and second separators 120*a* and 120*b*, it is more preferable that both ends of the first and second separators 120*a* and 120*b* are adhered along the longitudinal direction of the electrode plates 110 and 130.

For mutual adhesion of the first and second separators 120*a* and 120*b*, the binder included in the first and second separators 120*a* and 120*b* itself may be heat-sealed, but according to alternative embodiments, an adhesive can be added to the contact parts of the first and second separators 120*a* and 120*b* adjacent to each other. As such an adhesive, for example, a hot melt adhesive including ethylene vinyl acetate, polyurethane, or a mixture thereof can be used, but is not particularly limited thereto.

Figure 4B:
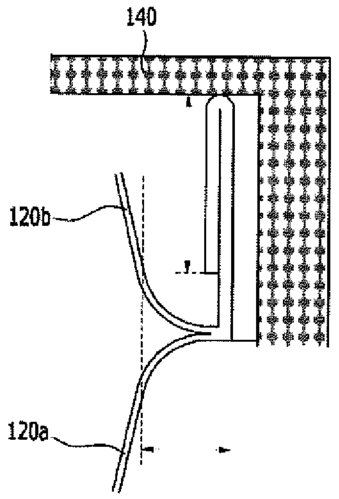
FIG. 4*b* is an enlarged cross-sectional view of folded parts of first and second separators indicated by a circle in broken lines in FIGS. 3*a*, 3*b* and 4*a*.

Further, in the electrode assembly 100 of one embodiment, at least one end or both ends of the first and second separators 120*a* and 120*b* adhered to each other can be folded so as to wrap the cathode plate 110 and/or the anode plate 130 (part indicated by a circle in FIGS. 3*a*, 3*b* and 4*a*). At this time, one end or both ends of the first and second separators 120*a* and 120*b* adhered to each other can be folded only once so as to wrap the cathode plate 110 and/or the anode plate 130, but it can be doubly folded as shown in FIG. 4*b*.

Due to such doubly folded structure, high-temperature thermal contraction of the separator can be more effectively suppressed, and the process of making the shape of the electrode assembly 100 more compact and thus inserting it into a pouch-type battery case or the like can be made more smoothly.

On the other hand, in the electrode assembly 100 described above, on the folded parts of the first and second separators 120*a* and 120*b*, an insulating tape 140 is formed so as to wrap the cathode plate 110 and the anode plate 130 in the width direction perpendicular to the length direction, while covering the folded parts of these separators. As shown in FIGS. 1, 3*a* and 3*b*, the insulating tape 140 may be attached to a plurality of insulating tapes 140 at regular intervals so as to wrap around the folded part of the separator, the cathode plate 110 and the anode plate 130. In addition, referring to FIG. 3*b*, in addition to the insulating tape 140, the insulating tape 140 may be further attached so as to further wrap around the cathode plate 110 and the anode plate 130 around the protrusion parts of the electrode tabs 115 and 135.

By the addition of the insulating tape 140, the high-temperature thermal contraction of the separator can be further suppressed, and the safety of the secondary battery can be further improved.

The type of the insulating tape 140 is not particularly limited, but for example, a polyimide-based insulating tape or a polyester-based insulating tape (e.g., PET or PEN-based insulating tape) can be used.

The above-mentioned electrode assembly may be housed in a battery case, for example, in a state impregnated in an electrolyte, to constitute a secondary battery. At this time, the electrode assembly may include a stack-type electrode-separator laminate, and may be mainly housed in a pouch-type battery case or a prismatic battery case.

At this time, as the battery case, a general battery case applied to a pouch-type or prismatic secondary battery can be used.

Further, an electrode assembly and a secondary battery including the same can be applied to various devices. Such a device may be applied to a vehicle means such as an electric bicycle, an electric vehicle, or a hybrid vehicle, but the present disclosure is not limited thereto, and is applicable to various devices that can use an electrode assembly and a secondary battery including the same, which also falls under the scope of the present disclosure.

Although preferred embodiments of the present disclosure have been described in detail above, the scope of the present disclosure is not limited thereto, and various modifications and improvements made by those skilled in the art using the basic concepts of the present disclosure, which are defined in the appended claims, also falls within the scope of the present disclosure.

DESCRIPTION OF REFERENCE NUMERALS

100: electrode assembly
110: electrode plate (cathode plate)
115: electrode tab (cathode tab)
120*a*, 120*b*: first and second separators
130: electrode plate (anode plate)
135: electrode tab (anode tab)
140: insulation tape

The invention claimed is:

1. An electrode assembly comprising:
a cathode plate;
an anode plate corresponding to the cathode plate;
first and second separators that are disposed adjacent to each other with the cathode plate or the anode plate interposed therebetween; and
an insulating tape,
wherein at least one end of the first separator is adhered to at least one end of the second separator along a longitudinal direction of the cathode plate and the anode plate,
wherein at least one end of the first and second separators is folded so as to wrap the cathode plate or the anode plate and form a respective folded part of the first and second separators, and
wherein the insulating tape covers the folded part of the first and second separators,
wherein the at least one end of the first and second separators adhered to each other are doubly folded.

2. The electrode assembly according to claim 1, wherein each of the cathode plate and the anode plate comprises:
an electrode current collector;
an electrode active material layer formed on the electrode current collector; and
an electrode tab protruding from the electrode current collector.

3. The electrode assembly according to claim 1, wherein the first and second separators have a width larger than that of each of the cathode plate and the anode plate.

4. The electrode assembly according to claim 1, wherein the first and second separators are adhered to the cathode plate or the anode plate facing each other.

5. The electrode assembly according to claim 1, wherein both ends of the first separator are respectively adhered to both ends of the second separator along the longitudinal direction of the cathode plate and the anode plate, and
wherein both ends of the first and second separators are folded so as to wrap the wrapped one of the cathode plate or the anode plate.

6. The electrode assembly according to claim 1, wherein the insulating tape wraps around the cathode plate and the anode plate along a width direction perpendicular to the longitudinal direction while covering the folded part and an additional folded part of the first and second separators.

7. The electrode assembly according to claim 2, wherein the insulating tape wraps around the cathode plate, the anode plate, and the electrode tab.

8. A secondary battery comprising:

the electrode assembly according to claim 1; and a battery case for housing the electrode assembly.

9. The secondary battery according to claim 8, wherein the battery case is a pouch-type battery case or a prismatic battery case.

10. The electrode assembly according to claim 7, wherein the insulating tape wraps around the cathode plate and the anode plate along a width direction perpendicular to the longitudinal direction while covering the folded part and an additional folded part of the first and second separators.

11. An electrode assembly comprising:

a cathode plate;

an anode plate corresponding to the cathode plate;

first and second separators that are disposed adjacent to each other with the cathode plate or the anode plate interposed therebetween; and an insulating tape, wherein both ends of the first separator are respectively adhered to both ends of the second separator along a longitudinal direction of the cathode plate and the anode plate, wherein both ends of the first and second separators are folded so as to wrap the cathode plate or the anode plate and form respective folded parts of the first and second separators, wherein the insulating tape covers the folded parts of the first and second separators, wherein each of the cathode plate and the anode plate comprises:

an electrode current collector;

an electrode active material layer formed on the electrode current collector; and an electrode tab protruding from the electrode current collector, and wherein the ends of the first and second separators adhered to each other are doubly folded.

12. The electrode assembly according to claim 11, wherein the insulating tape wraps around the cathode plate and the anode plate along a width direction perpendicular to the longitudinal direction while covering the folded parts of the first and second separators.

13. The electrode assembly according to claim 11, wherein the insulating tape wraps around the cathode plate, the anode plate, and the electrode tab.

14. The electrode assembly according to claim 13, wherein the insulating tape further wraps around the cathode plate and the anode plate along a width direction perpendicular to the longitudinal direction while covering the folded parts of the first and second separators.

15. A secondary battery comprising:

the electrode assembly according to claim 11; and a battery case for housing the electrode assembly.

16. The secondary battery according to claim 15, wherein the battery case is a pouch-type battery case or a prismatic battery case.

17. An electrode assembly comprising:

a cathode plate;

an anode plate corresponding to the cathode plate;

first and second separators that are disposed adjacent to each other with the cathode plate or the anode plate interposed therebetween; and an insulating tape, wherein both ends of the first separator are respectively adhered to both ends of the second separator along a longitudinal direction of the cathode plate and the anode plate, wherein both ends of the first and second separators are folded so as to wrap the cathode plate or the anode plate and form respective folded parts of the first and second separators, wherein the insulating tape covers the folded parts of the first and second separators, wherein each of the cathode plate and the anode plate comprises:

an electrode current collector;

an electrode active material layer formed on the electrode current collector; and an electrode tab protruding from the electrode current collector, wherein the insulating tape wraps around the cathode plate and the anode plate along a width direction perpendicular to the longitudinal direction while covering the folded parts of the first and second separators, wherein the insulating tape wraps around the cathode plate, the anode plate, and the electrode tab, and wherein the ends of the first and second separators adhered to each other are doubly folded.

18. A secondary battery comprising:

the electrode assembly according to claim 17; and a battery case for housing the electrode assembly.

19. The secondary battery according to claim 18, wherein the battery case is a pouch-type battery case or a prismatic battery case.

* * * * *